Jan. 29, 1935. G. E. DISNEY 1,989,474
SHAPING APPARATUS.
Filed Oct. 15, 1932
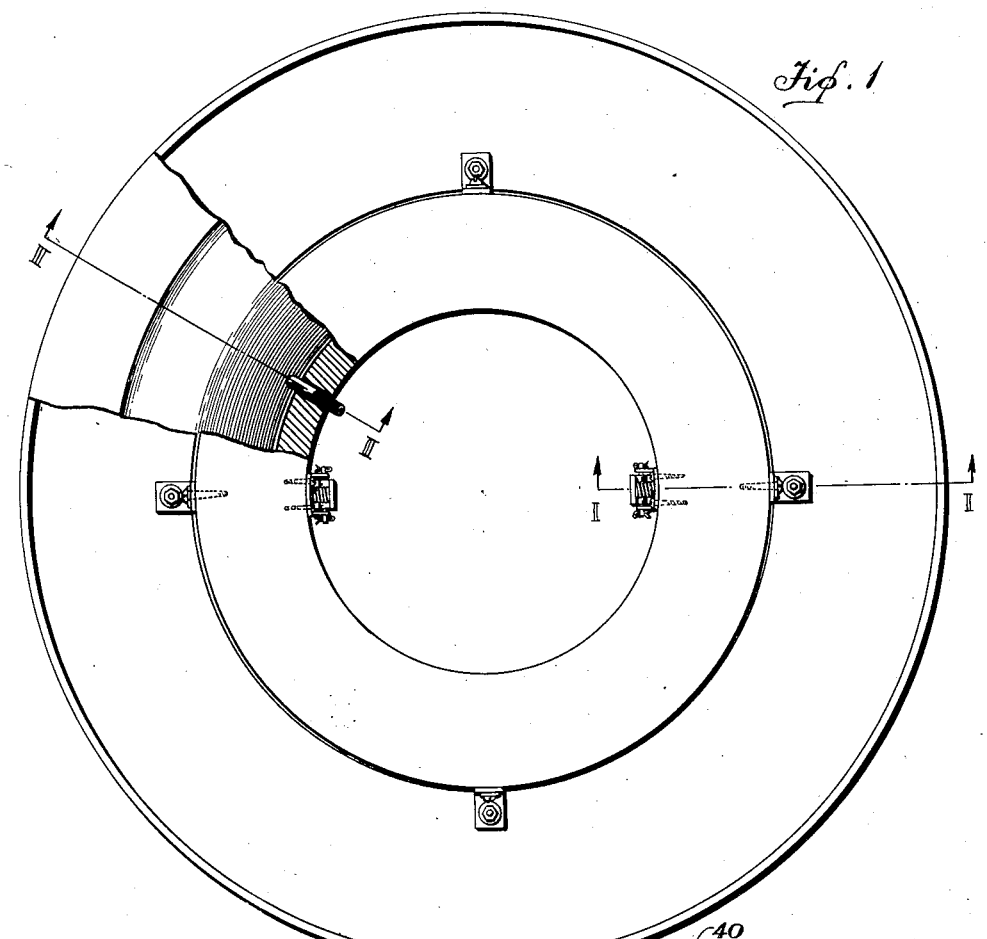
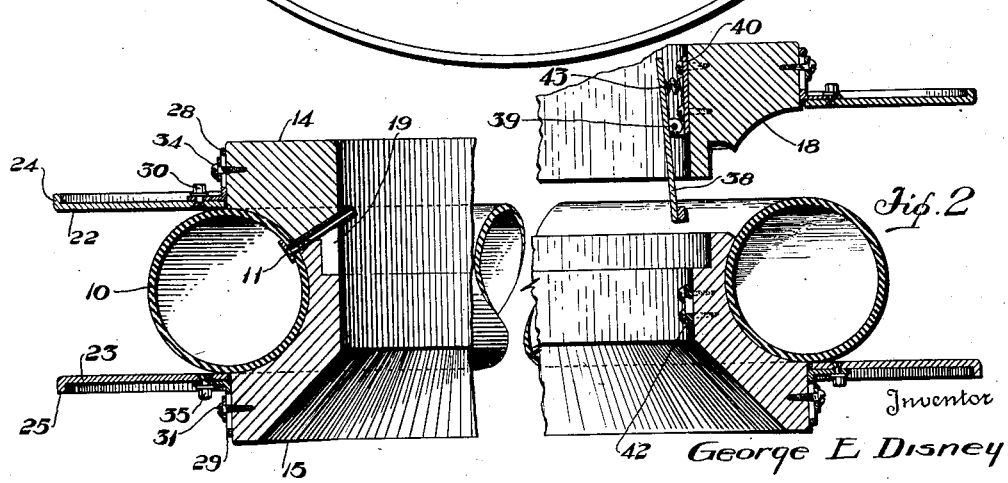
Inventor
George E. Disney
By
Attorney Patented Jan. 29, 1935

1,989,474

UNITED STATES PATENT OFFICE 1,989,474

SHAPING APPARATUS

George E. Disney, Akron, Ohio, assignor to Wingfoot Corporation, Wilmington, Del., a corporation of Delaware Application October 15, 1932, Serial No. 637,900

8 Claims. (Cl. 18—2)

This invention relates to apparatus for shaping rubber articles and more particularly relates to apparatus for giving a preliminary set or shape to unvulcanized inner tubes of the character to be employed in conjunction with pneumatic tires.

Heretofore in producing certain rubber articles, such as inner tubes, considerable difficulty has been experienced in shaping the unvulcanized articles so that when the same are placed in the vulcanizing mold there will be no spot curing of the article due to premature contact of certain portions of the article with the mold. Again it has been found that if the unvulcanized article is non-uniformly placed in the curing mold there may be a flow of rubber during the vulcanizing process which is apt to produce an article having walls of non-uniform thickness. It also has been found that when unvulcanized rubber articles are placed in the curing molds, a pinching of the article by the mold is apt to occur if the unvulcanized article has been given no preliminary set.

The foregoing difficulties are particularly prevalent in the production of inner tubes for super-balloon pneumatic tires of the type which has recently proven popular for automobiles and other land vehicles, as well as aircraft. This has been because the super-balloon inner tube is of comparatively large cross-sectional dimensions as compared with its bead diameter. Thus if the inner tube is made by an extruding operation with the ends of a length of the extruded tube being thereafter joined together, it will be evident that, when inflated, the outer portion or tread wall of the tube will have to expand a considerably greater amount than will the inner portion or base wall. If this expanding operation is performed in the vulcanizing mold it will be obvious that some difficulty may be experienced because of the fact that the inner periphery of the tube will contact prematurely and at a somewhat greater interval of time with the hot surfaces of the vulcanized mold. Again the vulcanizing mold is apt to cause a non-uniform expansion of the outer portion or periphery of the inner tube.

If the super-balloon inner tube produced is one in which the bead diameter is materially smaller than the cross-sectional diameter, as is the case in an airplane tire which mounts directly upon a supporting hub, then other methods of producing the inner tube may be employed. By one of these methods it has been the practice to make up an inner tube from two flat centrally apertured discs of rubber which are joined at their central apertures with a short length of tubing of approximately the bead diameter of the tire in which the tube is to be employed, and at their outer circumferential edges with a circumferentially extending strip. A rough doughnut-shaped inner tube is thus produced which is preferably given a set or a preliminary shaping prior to its insertion in the vulcanizing mold to avoid the difficulties set forth above.

It is an object of the present invention to avoid and overcome the difficulties encountered in producing rubber articles as described above by the provision of shaping means adapted to give the rubber articles a preliminary set or shaping prior to insertion thereof in the vulcanizing mold.

Another object of the invention is to provide apparatus for the preliminary shaping of unvulcanized super-balloon inner tubes.

Another object of the invention is to provide mechanism whereby rubber articles can be formed to substantially their completed or vulcanized shape by a preliminary shaping but non-vulcanizing operation.

Another object of the invention is to provide a light weight, inexpensive, easily operated apparatus whereby inflatable articles such as inner tubes can be given an initial blow-up or shaping operation prior to the curing thereof.

Another object of the present invention is to provide a wooden shaping mold for giving a super-balloon inner tube an initial set prior to the vulcanization operation.

The foregoing and other objects of the invention are achieved by the apparatus illustrated in the accompanying drawing, wherein:

Fig. 1 is a plan view of one form of the apparatus comprising the present invention, with a portion thereof being broken away to better illustrate the details of its construction;

Fig. 2 is a cross-sectional view of the apparatus shown in Fig. 1 taken on line II—II thereof, with the parts in separated relation; and Fig. 3 is a cross-sectional view taken on line III—III of Fig. 1, with the parts assembled together.

Referring now to the drawing which illustrates one form of the invention, the numeral 10 indicates an inner tube having a conventional valve stem 11 associated with it to facilitate inflation. The initial set or shape of the inner tube 10 is accomplished by means of a pair of complimentary mating mold members 14 and 15 which are preferably formed of light weight material such as wood.

The mold members 14 and 15 are endless and annular and may preferably be formed male and female respectively, as illustrated in the drawing, to insure the proper concentric alining and coaction thereof. These members have their outer peripheries grooved so that, when assembled together, they present an annular cavity 18 of substantially semi-circular cross-section. As will be seen from the drawing, the lower or female mold member 15 contains more than half of the cavity 18 and thereby is better adapted to initially receive and hold the inner tube 10 to be shaped, and to prevent pinching of the inner tube when the two mold members are brought together. The valve stem 11 in the inner tube 10 extends through a suitable slot or opening 19 in the male mold member 14. This slotted opening 19 allows the male mold member 14 to be dropped in position over the tube and into cooperating relation with the female mold member 15 after the inner tube 10 has been initially placed in the portion of the cavity 18 upon the female mold member 15. It may be found necessary or advisable to provide a small slotted opening in the female mold member 15 to assist the slot 19 and to insure the proper gripping of the valve stem 11.

In order to limit the expansion of the sidewalls of the tube 10, the mold members 14 and 15 are provided with additional shaping elements in the form of ring-like plates 22 and 23. These plates 22 and 23 are preferably made of light weight strong sheet metal and may be provided with flanged outer peripheries 24 and 25 respectively which function to strengthen the same. The plates are adjustably secured to the mold members 14 and 15 through the agency of suitable means such as angle brackets 28 and 29 which are bolted as at 30 and 31 to the plates 22 and 23. The legs of angle brackets 28 and 29 adjacent the mold members 14 and 15 are slotted to receive screw means 34 and 35 which serve to adjustably secure the brackets and thus the plates 22 and 23 to the mold members.

Means are provided for normally locking the mold members 14 and 15 together during the shaping or setting operation, which means may obviously take a plurality of forms. As illustrated in the drawing, these means may comprise a lever 38 pivotally mounted as at 39 upon a bracket 40 secured to one of the mold members, preferably the upper or male mold member 14. An apertured plate 42 is secured to the other mold member 15, the aperture being adapted to receive the hooked end of the lever 38. A spring 43 is ordinarily provided to urge the lever 38 toward the locking position.

It is believed that the operation of the apparatus will be apparent from the foregoing description. However, a brief résumé thereof follows:

With the upper or male member 14 removed the inner tube, which has been constructed in any one of the manners discussed above or by other known methods, is dropped down over the upwardly extending portion of the female mold member 15 and the tube is initially positioned in the cavity 18 as illustrated in Fig. 2. There is, however, substantially no air or other inflating fluid in the tube at this time. The male mold member 14 is then brought over the assembly and lowered in position with respect to the female mold member 15. The slot 19 in the mold member 14 is, of course, positioned so that the same will slide down over the valve stem 11 of the inner tube 10. Thereafter the plates 22 and 23 are adjusted vertically to the desired position if this has not been done before. This operation is, of course, possible due to the adjustable connection provided by the slots in the angle brackets 28 and 29.

The inner tube 10 is now inflated through the valve stem 11 to any desired pressure to cause the tube to swell up to the toroidal shape defined by the cavity 18 and side plates 22 and 23, whereupon the whole assembly is allowed to sit for any length of time desired. By way of example, it may be stated that in practice, about three minutes have been found sufficient to effect a "set" of the rubber tube in the apparatus illustrated and described. This time period may vary, however, according to the size of the tube and properties of the compound from which it is formed. Thereafter the member 14 may be removed, leaving the tube 10 free to be released from the cavity 18, and, due to the preliminary setting or shaping, the tube can be readily placed in a vulcanizing mold without spotting or improper stretching and the same is thereafter cured in the usual manner.

While the invention has been particularly illustrated and described as being adapted for use in conjunction with inner tubes for super-balloon type pneumatic tires, nevertheless it will be apparent that the principles thereof are readily applicable to the preliminary shaping of substantially any inflatable rubber or plastic object. It will, moreover, be understood that while applicant's apparatus preferably does not completely enclose the article to be shaped, the invention contemplates shaping in this manner as well, or in other ways which function to produce the desired set or initial shaping of the rubber article. In this respect the position of the adjustable plates 22 and 23 can be varied to control the particular type of initial setting or shaping to be given the rubber article.

From the foregoing it will be evident that mechanism has been provided by the present invention to initially form rubber articles while in the unvulcanized state whereby the vulcanizing operation performed thereon is expedited and improved. This mechanism is designed to be light in weight, inexpensive, and easily and quickly handled by the inexperienced workman.

While the particular cooperating relation of the mold members 14 and 15 has been described, as has been the material from which the mold members are produced, nevertheless it will be apparent that these particular features of the specific embodiment of the invention described can be widely varied without departing from the present invention. In a like manner, the shape and relative amount of cavity in each of the mating mold members can be varied to obtain the desired shape and the necessary initial holding functions of the apparatus. In fact, any or all of the foregoing and other changes may be made without departing from the spirit of the invention as defined by the appended claims.

What I claim is:

1. Tube forming apparatus comprising a pair of wooden, mating mold members having complementary grooves providing a cavity adapted to receive and engage the inner periphery of an unvulcanized unformed rubber inner tube, a plate surrounding each of the mold members and serving to limit sidewise expansion of the tube when inflated without engaging the outer periphery of the tube, means adjustably and individually securing the plates to the mold members, and means for releasably securing the mold members together.

2. Tube forming apparatus comprising a pair of mating mold members having complementary grooves providing a cavity adapted to receive and engage only the inner periphery of an unvulcanized unshaped rubber inner tube, a plate surrounding each of the mold members and serving to limit sidewise expansion of the inner tube when inflated without engaging the outer periphery of the tube, means adjustably and individually securing the plates to the mold members, and means for releasably securing the mold members together.

3. Tube forming apparatus comprising a pair of mating mold members having complementary peripheral grooves providing a cavity adapted to receive and engage only the inner periphery of an unvulcanized unformed rubber inner tube, a plate associated with each of the mold members and extending radially outward therefrom at each side of said cavity and serving to limit sidewise expansion of the inner tube to be shaped, and means for releasably securing the mold members together.

4. Tube forming apparatus comprising a pair of annular mating mold members having complementary peripheral grooves providing a cavity adapted to receive and partially surround an unvulcanized unformed rubber inner tube, a plate extending radially outward from each of the mold members adjacent each side of said cavity and serving to partially confine the article to be shaped, and means adjustably and individually securing the plates to the mold members.

5. For giving preliminary set to an unvulcanized rubber inner tube, a shaping apparatus comprising a pair of mating annular body members jointly formed with a peripheral groove adapted to receive the inner tube and snugly to seat the inner periphery of said tube when expanded, and a pair of annular flanges associated one with each of the body members and adapted to limit sidewise expansion of the tube without confining the outer peripheral portion thereof.

6. For giving preliminary set to an unvulcanized rubber inner tube, a shaping apparatus comprising a pair of mating annular body members jointly formed with a peripheral groove adapted to receive the inner tube and snugly to seat the inner periphery of said tube when expanded but leaving the outer periphery of the tube free and unengaged, one of said members containing more than half of the jointly formed groove.

7. For giving preliminary set to an unvulcanized rubber inner tube, a shaping apparatus comprising a pair of mating annular body members jointly formed with a peripheral groove adapted to receive the inner tube and snugly to seat the inner periphery of said tube when expanded without confining the outer peripheral portion thereof, one of said members containing more than half of the jointly formed groove, and quickly detachable means for securing the annular body members together.

8. Tube-forming apparatus of the class described comprising a circular body adapted to receive an unvulcanized inner tube and to support the same in inflated condition, said circular body including means for limiting contraction of the inner periphery of the tube and means for limiting expansion of the side portions of the tube without engaging the outer peripheral portion thereof.

GEORGE E. DISNEY.